(12) United States Patent
Grosse Bley

(10) Patent No.: US 7,793,534 B2
(45) Date of Patent: Sep. 14, 2010

(54) GAS PRESSURE SENSOR

(75) Inventor: Werner Grosse Bley, Bonn (DE)

(73) Assignee: Inficon GmbH (DE)

( * ) Notice: Subject to any disclaimer, the term of this patent is extended or adjusted under 35 U.S.C. 154(b) by 386 days.

(21) Appl. No.: 11/793,623

(22) PCT Filed: Nov. 29, 2005

(86) PCT No.: PCT/EP2005/056317

§ 371 (c)(1),
(2), (4) Date: Jun. 19, 2007

(87) PCT Pub. No.: WO2006/069876

PCT Pub. Date: Jul. 6, 2006

(65) Prior Publication Data

US 2008/0164148 A1    Jul. 10, 2008

(30) Foreign Application Priority Data

Dec. 23, 2004   (DE) ................. 10 2004 062 101

(51) Int. Cl.
*G01N 7/00* (2006.01)

(52) U.S. Cl. .................. 73/31.04; 73/31.05; 73/23.2; 73/1.02; 324/464; 324/460; 204/424

(58) Field of Classification Search ......... 204/400–435; 324/460, 463, 464; 73/31.05, 23.2, 31.04, 73/1.02
See application file for complete search history.

(56) References Cited

U.S. PATENT DOCUMENTS

| | | | |
|---|---|---|---|
| 3,855,098 A * | 12/1974 | Fletcher, III | 204/420 |
| 3,867,631 A | 2/1975 | Briggs et al. | |
| 4,270,091 A * | 5/1981 | Mann | 324/462 |
| 4,477,778 A | 10/1984 | Lawrence, Jr. et al. | |
| 5,182,523 A * | 1/1993 | Ertel et al. | 324/663 |
| 5,661,229 A | 8/1997 | Bohm et al. | |
| 6,277,177 B1 | 8/2001 | Bley et al. | |
| 6,660,614 B2 * | 12/2003 | Hirschfeld et al. | 438/455 |

(Continued)

FOREIGN PATENT DOCUMENTS

DE    10031882 A1    1/2002

(Continued)

OTHER PUBLICATIONS

Zinsmeister, G., "Uber ein Lecksuchgerat mit Kaltkathoden-Ionisationsmanometer" Vakuum-Technik, vol. 9, No. 4, May 31, 1960, pp. 101-104, XP009061356, Berlin, p. 101-102.

(Continued)

*Primary Examiner*—Alexa D Neckel
*Assistant Examiner*—Jennifer Dieterle
(74) *Attorney, Agent, or Firm*—Marjama Muldoon Blasiak & Sullivan LLP

(57) ABSTRACT

A selective gas sensor is for determining the presence of a test gas, for example, helium includes an evacuated housing, sealed by a selectively gas-permeable membrane. The membrane is part of a sight glass, whereby the glass pane is provided with a hole, sealed by the membrane made from a silicon material. The frame of the membrane wall is connected to the housing by means of a high-vacuum soft-metal seal. The housing can also form one of the electrodes of the gas pressure sensor.

7 Claims, 1 Drawing Sheet

U.S. PATENT DOCUMENTS

| | | |
|---|---|---|
| 7,266,991 B2 | 9/2007 | Bley |
| 2003/0159929 A1* | 8/2003 | Werner .................. 204/409 |
| 2005/0229786 A1 | 10/2005 | Wetzig |
| 2005/0230768 A1* | 10/2005 | Mei ....................... 257/415 |

FOREIGN PATENT DOCUMENTS

| | | |
|---|---|---|
| WO | WO-95/04921 A1 | 2/1995 |
| WO | WO-96/41677 A1 | 12/1996 |
| WO | WO-03/052371 A1 | 6/2003 |
| WO | WO-2006069876 A1 | 7/2006 |

OTHER PUBLICATIONS

International Search Report for International Patent Application PCT/EP2005/056317, 6 pages, report dated Feb. 21, 2006.

* cited by examiner

GAS PRESSURE SENSOR

FIELD OF THE INVENTION

The invention is directed to a selective gas sensor comprising an evacuated housing sealed by a selectively permeable membrane and including a gas pressure sensor with at least two electrodes.

BACKGROUND OF THE INVENTION

EP 0 831 964 B1 (Leybold Vakuum GmbH) describes a selective gas sensor comprising an evacuated housing sealed by a membrane. The membrane is made of a silicon material such as quartz, quartz glass, pyrex glass, silicon oxide, silicon nitride, silicon oxynitride, or silicon carbide, arranged on a silicon disc. The silicon discs has recesses in the form of windows in which heating walls are provided on the membrane. Such a membrane is selectively permeable to light gases such as helium or hydrogen, while it is impermeable to other gases. By the passage of gases through the membrane, the pressure in the housing, which initially holds a high vacuum, is increased. The other walls of the housing, except for the membrane, are vacuum-tight.

DE 100 31 882 A1 (Leybold Vakuum GmbH) describes a sensor for helium or hydrogen using of the principle of a selectively permeable membrane. The housing of the sensor is made of glass and the selective passage is a membrane of a silicon material that is provided with a silicon disk having through holes, as well as with a heating. The housing accommodates a gas pressure sensor in the form of a Penning arrangement or a magnetron that responds to the total pressure of the gas having entered the housing. Thus, a relatively simple gas pressure sensor may be used instead of a mass spectrometer. The gas pressure sensor has at least two electrodes arranged in the housing and, in addition, a magnet provided outside the housing and generating a magnetic field penetrating the housing. The glass housing is sensitive to impacts and is fragile. The housing of borosilicate glass has approximately the same coefficient of thermal expansion as the silicon of the membrane so that both may be connected through anodic bonding or diffusion welding. Because of the high vacuum prevailing therein, the housing must not comprise any seals or adhesives that might cause gas leakages, thereby impairing the detection limit.

SUMMARY OF THE INVENTION

It is an object of the invention to provide a selective gas sensor with a robust housing and which is thus mechanically insensitive.

The gas sensor of the present invention is provided with a housing is made of metal and a membrane wall with a metal frame to which a glass pane is bonded, wherein the glass pane has a hole sealed by the membrane.

The gas sensor generally uses sight glasses frequently used in vacuum technology. The glass window is modified such that it is provided with a hole, made, for example, by laser or water jet cutting. The selectively permeable membrane, which is a quartz window chip, is anodically bonded to the glass. The metal frame supporting the glass may be fastened to the housing without elastomer seals in a manner adapted for UHV applications, where UHV means ultra-high vacuum.

The gas pressure sensor provided in the housing is a cold cathode measuring cell comprising at least two electrodes, preferably a Penning measuring cell or a magnetron, as described in DE 100 13 882 A1. Since, according to the invention, the housing is made of metal, it is adapted to form one of the electrodes of the measuring cell. Thus, the metal housing allows at least one electrode to be omitted which would otherwise have to be provided inside the housing. Preferably, the housing is made from a non-magnetic material such that the magnetic field of a magnet arrangement situated outside the housing can penetrate into the housing. Non-magnetic stainless steel is a suitable material for the housing.

A preferred embodiment of the invention provides that at least one electrode arranged in the housing is connected to a TRIAX bushing at the housing. Since the housing is made from an electrically conductive material, an insulating current bushing is required, which is preferably provided with a shield.

It is a particular advantage of the invention that, generally, any type of sight glass adapted for UHV applications can be used as the membrane wall. The sight glass must merely be modified such that its glass pane is provided with a hole to the edge of which the membrane of silicon material is then bonded.

BRIEF DESCRIPTION OF THE DRAWINGS

The following is a detailed description of embodiments of the invention with reference to the drawings, in which.

DETAILED DESCRIPTION

Figure 1:
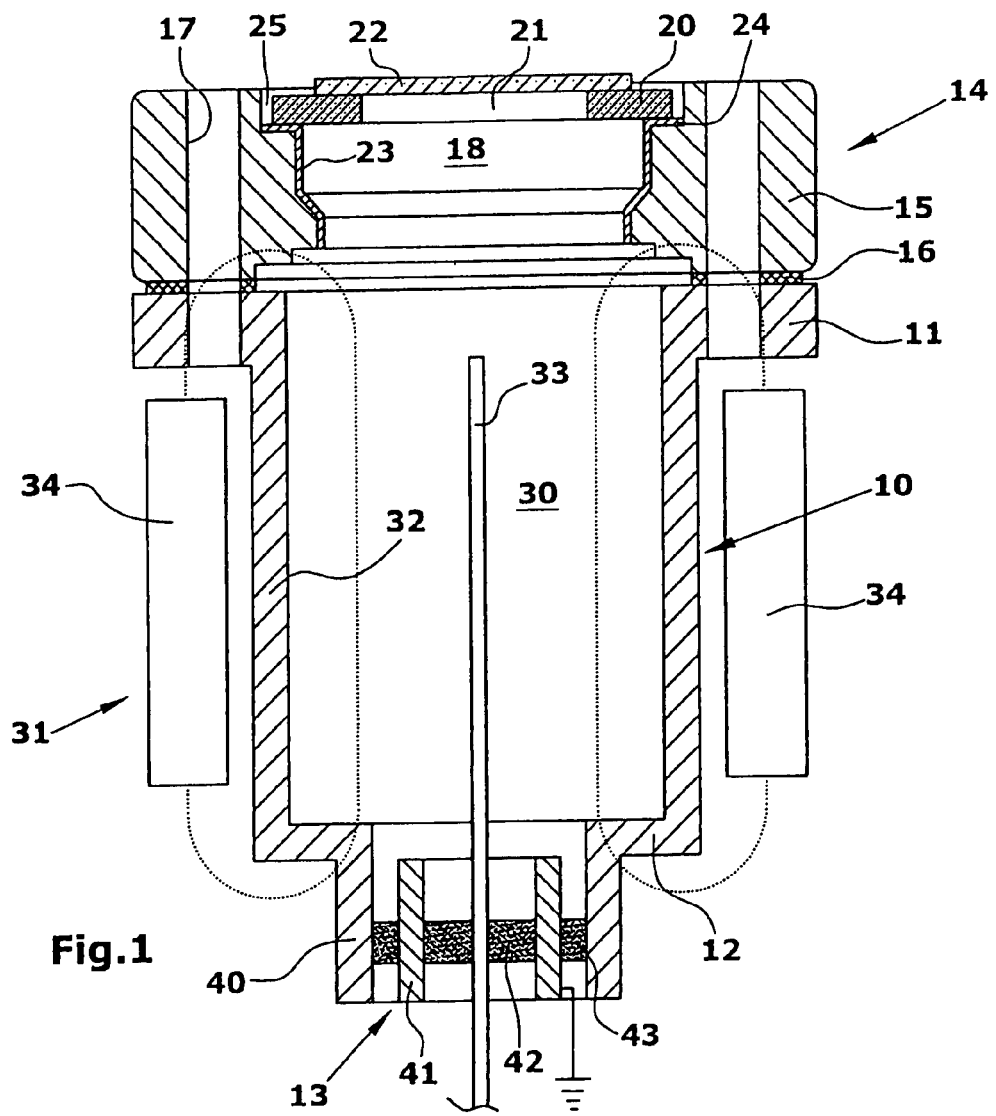
FIG. 1 is a longitudinal section through a gas sensor with a first embodiment of the membrane wall.

The gas sensor illustrated in FIG. 1 comprises a cylindrical housing 10 having a flange 11 at one end, the other end forming a bottom 12 in which a current bushing 13 is arranged that will be discussed later. The housing 10 is made from non-magnetic stainless steel.

The open end of the housing 10 is sealed by the membrane wall 14. The same has a frame 15 or flange which, with a soft metal seal 16 of copper interposed, is connected with the flange 11 of the housing 10. The connection is made using screws that are passed through corresponding holes 17 and are then tightened.

The frame 15 is also made from stainless steel. It has a central passage opening 18 sealed at the end averted from the housing 10 by a glass pane 20 of borosilicate. The glass pane 20 has a central hole 21 covered by a selectively gas-permeable membrane 22 of silicon material.

In order to adapt the different coefficients of expansion of the frame 15 and the glass pane 20, the wall of the passage 18 is lined with a ring 23 of KOVAR, an alloy of iron and nickel. At its outer end, the ring 23 has a radially projecting flange 24 sitting in a recess 25 of the frame 15, covering the bottom thereof. The glass pane 20 is sunk into the recess 25, its edge abutting the flange 24. The ring 23 is thermally bonded both to the frame 15 and to the glass pane 20.

The hole 21 is cut in the glass pane 20 by laser or water jet cutting techniques. The outer surface about the hole 21 is then polished until it has an optically reflective quality. Then, the membrane 22, which is a silicon chip with helium-permeable windows, e.g. as in EP 0 831 964 B1, is bonded in a high-vacuum tight manner to the glass surface using anodic bonding. To this end, the glass pane 20 and the membrane 22 are heated to temperatures between 200 and 400° C. Subsequently, an electric DC voltage is applied across the frame 15 and the bushing 23, whereby charge carriers are exchanged between the membrane 22 and the glass pane 20 and a chemical bonding is created. Thus, an elastomeric seal can be completely omitted at the junction of the glass and the membrane 22. The shape of the hole 21 in the glass pane 20 is adapted to the shape of the membrane 22, however, the membrane 22 is larger than the hole 21 so that its edge rests on the glass pane 20.

The housing 10 encloses an evacuated chamber 30 in which an ultra-high vacuum prevails. The housing 10 is part of a gas pressure sensor that supplies an electric signal corresponding to the gas pressure prevailing in the chamber 30. The gas pressure sensor 31 forms a cold cathode measuring system, i.e. a magnetron in this instance. The cathode is formed by the wall 32 of the housing 10 and the anode 33 is arranged coaxial therewith in the housing 10 and lead out from the current bushing 13. A magnet arrangement 34 is provided around the housing 10 outside thereof, generating a permanent magnetic field in the chamber 30 as indicated by dotted lines.

On the bottom 12 of the housing 10, a cylindrical hub 40 is situated that receives the current bushing 13. The bushing 13 has a shielding ring 41 arranged coaxial to the anode 33. Between the anode 33 and the shielding ring 41, an annular ceramic wall 42 is provided. Another ceramic wall 43 coaxial therewith is situated between the shielding ring 41 and the hub 40. This current bushing is referred to as a TRIAX bushing. The shielding ring 41 is connected to mass potential. The system allows for the measurement of very small discharge currents without leak currents to the measuring mass potential.

The measuring system of the device in FIG. 1 generally corresponds to the magnetron measuring system described in DE 100 31 882 A1, however, the housing wall 32 forms the cathode. As an alternative, it is possible to design the measuring system as a Penning measuring system, also described in DE 100 31 882 A1, where at least one of the plate-shaped cathodes is formed by the housing. In this case, the housing should be of parallelepiped shape. It is also possible to manufacture the housing from two mutually insulated halves and to design each of the two halves as a cathode.

Figure 2:
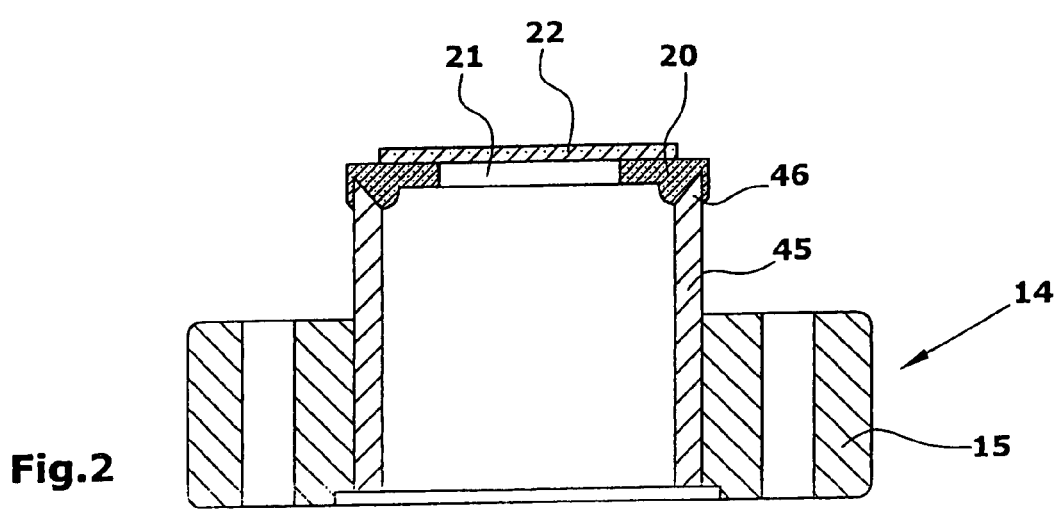
FIG. 2 is an alternative embodiment of the membrane wall.

FIG. 2 illustrates an alternative embodiment of the membrane wall 14. A steel jacket 45 sits in a frame 15 forming a flange adapted to be set onto the housing, the jacket being welded to the frame 15. The outer end of the jacket 45 is beveled at 46 so that an annular point is formed. The glass pane 20 is thermally bonded thereto. Here, the glass pane 20 also has a hole 21 covered by the membrane 22 made of silicon material and being selectively helium-permeable. In this instance, the ring 23 that serves for thermal adaptation in the first embodiment is not required.

The membrane 22 is made of a substrate of porous silicon bonded to the glass pane 20. This substrate is covered with a thin layer that is selectively permeable only to the test gas, e.g. helium. The coefficient of thermal expansion of the silicon membrane 22 is adapted to the glass of the glass pane 20, which is also based on silicon.

The invention claimed is:

1. A gas pressure sensor comprising:
   at least two electrodes;
   a membrane wall comprising a metal frame bonded to a glass pane, said glass pane having a hole that is sealed by a selectively permeable membrane;
   an evacuated non-magnetic metal housing comprising a chamber having an open end sealed by said membrane wall, said non-magnetic metal housing is configured to form one of said at least two electrodes;
   a magnet positioned outside of said non-magnetic metal housing configured to generate a permanent magnetic field in said chamber of said non-magnetic metal housing; and
   at least one electrode positioned inside said non-magnetic metal housing and connected by an insulating current bushing.

2. The gas pressure sensor of claim 1, wherein said glass pane is bonded to said metal frame by a metal sheet made from an iron/nickel alloy.

3. The gas pressure sensor of claim 1, wherein said metal frame further comprises a flange and said non-magnetic metal housing further comprises a flange, wherein said flange of said metal frame is connected to said flange of said non-magnetic metal housing with a soft metal seal.

4. The gas pressure sensor of claim 1, wherein said insulating current bushing comprises an inner non-conductive annular wall coaxially located between said at least one electrode located in said chamber and an annular shielding ring, and an outer non-conductive annular wall coaxially located between said shielding ring and an inner wall of said non-magnetic metal housing.

5. The gas pressure sensor of claim 1, wherein said glass pane is anodically bonded directly to said metal frame.

6. The gas pressure sensor of claim 1, wherein said gas pressure sensor is configured to function as a Penning cell.

7. The gas pressure sensor of claim 1, wherein said gas pressure sensor is configured to function as a magnetron.

* * * * *